United States Patent
Dubois

(10) Patent No.: US 11,339,450 B2
(45) Date of Patent: May 24, 2022

(54) METHOD AND DEVICE FOR REACTION CONTROL

(71) Applicant: Cockerill Maintenance & Ingenierie S.A., Seraing (BE)

(72) Inventor: Michel Dubois, Boncelles (BE)

(73) Assignee: COCKERILL MAINTENANCE & INGENIERIE S.A., Seraing (BE)

( * ) Notice: Subject to any disclaimer, the term of this patent is extended or adjusted under 35 U.S.C. 154(b) by 303 days.

(21) Appl. No.: 15/566,725

(22) PCT Filed: Apr. 19, 2016

(86) PCT No.: PCT/EP2016/058625
§ 371 (c)(1),
(2) Date: Oct. 16, 2017

(87) PCT Pub. No.: WO2016/169918
PCT Pub. Date: Oct. 27, 2016

(65) Prior Publication Data
US 2018/0100209 A1 Apr. 12, 2018

(30) Foreign Application Priority Data
Apr. 22, 2015 (EP) .................................... 15164575
Nov. 20, 2015 (EP) .................................... 15195644

(51) Int. Cl.
*C23C 8/14* (2006.01)
*C21D 1/74* (2006.01)
(Continued)

(52) U.S. Cl.
CPC ............... *C21D 1/76* (2013.01); *C21D 9/46* (2013.01); *C21D 9/561* (2013.01); *C21D 9/60* (2013.01);
(Continued)

(58) Field of Classification Search
CPC . C21D 1/73; C21D 9/46; C21D 9/561; C21D 9/60; C21D 9/62; C21D 11/00; C23C 2/02; C23C 8/10
See application file for complete search history.

(56) References Cited

U.S. PATENT DOCUMENTS 4,183,983 A 1/1980 Cook et al.
8,636,854 B2 1/2014 Leuschner et al.
(Continued)

FOREIGN PATENT DOCUMENTS

JP 2010132975 A 6/2010
WO WO 2015088501 A1 6/2015

*Primary Examiner* — Lois L Zheng
(74) *Attorney, Agent, or Firm* — Leydig, Voit & Mayer, Ltd.

(57) ABSTRACT

A method for controlling surface reactions on a steel strip running through a furnace includes, successively, a first section, a second section, and a third section separated by a sealing element, an atmosphere in the second and third sections being oxidizing and reducing respectively, the method including: heating, in the first section, the steel strip to between 600 and 750° C., while causing the atmosphere therein to be slightly oxidizing and to include: an $H_2$ content inferior to 2%; an $O_2$ content inferior to 0.1%; an $H_2O$ or $CO_2$, or $H_2O+CO_2$ content superior to 0.03%; a controlled dew point ranging from −50 to −15° C.; and a controlled concentration of $CO+CO_2$ maintained below 2%. All percentages are expressed in terms of volume.

17 Claims, 1 Drawing Sheet

(51) Int. Cl.
*C21D 1/76* (2006.01)
*C21D 9/46* (2006.01)
*C21D 9/56* (2006.01)
*C21D 9/60* (2006.01)
*C21D 9/62* (2006.01)
C23C 2/00 (2006.01)
C23C 8/10 (2006.01)
C23C 8/18 (2006.01)
C23C 2/02 (2006.01)
C21D 11/00 (2006.01)

(52) U.S. Cl.
CPC ............... *C21D 9/62* (2013.01); *C21D 11/00* (2013.01); *C23C 2/02* (2013.01); *C23C 8/10* (2013.01); *Y02P 10/25* (2015.11)

(56) References Cited

U.S. PATENT DOCUMENTS

| | | | |
|---|---|---|---|
| 2009/0123651 A1 | 5/2009 | Okada | |
| 2014/0174608 A1* | 6/2014 | Miyata | C21D 1/76 |
| | | | 148/243 |
| 2015/0090182 A1* | 4/2015 | Sato | C21D 1/76 |
| | | | 118/712 |

\* cited by examiner

METHOD AND DEVICE FOR REACTION CONTROL

CROSS-REFERENCE TO PRIOR APPLICATIONS

This application is a U.S. National Phase application under 35 U.S.C. § 371 of International Application No. PCT/EP2016/058625, filed on Apr. 19, 2016, and claims benefit to European Patent Application No. 15164575.1, filed on Apr. 22, 2015, and European Patent Application No. 15195644.8, filed on Nov. 20, 2015. The International Application was published in English on Oct. 27, 2016 as WO 2016/169918 under PCT Article 21(2).

FIELD

The invention relates to a device and a method for controlling the surface reaction on steel strips transported in a continuous galvanizing or annealing line.

BACKGROUND

High strength steel grades generally comprise high contents of elements like silicon, manganese and chromium (respectively typically between 0.5 and 2%; 1.5 and 6%, 0.3 and 1% in wt) making them difficult to coat because an oxide layer of those elements is formed during the annealing preceding the dipping in the galvanizing bath. This oxide layer harms the wetting ability of the steel surface when submerged in the bath. As a result, uncoated areas and a poor adhesion of the coating are obtained.

It is well-known that the surface quality of the steel strip and hence the wettability of the surface can be improved by modulating the atmosphere through the annealing furnace. For example, the U.S. Pat. No. 8,636,854 discloses an annealing furnace divided into three zones with different atmospheres. In the first zone, the strip is heated up to a temperature superior to 750° C. in a reducing atmosphere containing at least 2% $H_2$. In the second zone operating under oxidizing conditions, the iron surface is converted into an iron oxide layer and, in the third zone operating under reducing conditions, the oxide layer previously formed is reduced. This method and the furnace used for carrying out this method have several drawbacks that can be summarized as follows:

The reducing atmosphere before the oxidation of the iron surface increases the risk of external oxidation of the alloying elements. This is especially the case when the oxidation takes place at high temperature like 750° C. because elements like manganese start to oxidize significantly over 600° C.

The oxidation zone i.e. the second zone is located inside the furnace with no specific casing. It results in a lot of technical problems due to the high temperatures that the oxidation chamber must withstand as well as the eventual devices that may be used to separate the various zones. Moreover, when the oxidation section is inside the main furnace, it is very difficult to control the oxidation state of the sheet since the surface cannot be seen. Therefore, measurement systems cannot be installed.

Furnaces comprising several zones located in separated casings exist. As an example, the U.S. Pat. No. 4,183,983 discloses a furnace with three physically separated sections. There is a first direct fired zone wherein the fuel-air ratio is adjusted to provide the necessary reducing character of the gases resulting from the combustion. There is a second zone with a low reducing atmosphere having less than 6% hydrogen and finally, there is a third zone wherein the strip is cooled under reducing conditions. As indicated above, the reducing conditions used during the heating in the first zone are not appropriate for alloyed steels. Moreover, the direct fired furnace operating by adjusting the fuel-air ratio does not allow a fine tuning of the parameters controlling the surface reactions.

SUMMARY

In an embodiment, the present invention provides a method for controlling surface reactions on a steel strip running through a furnace comprising, successively, a first section, a second section, and a third section separated by a sealing element, an atmosphere in the second and third sections being oxidizing and reducing respectively, the method comprising: heating, in the first section, the steel strip to between 600 and 750° C., while causing the atmosphere therein to be slightly oxidizing and to include: an $H_2$ content inferior to 2%; an $O_2$ content inferior to 0.1%; an $H_2O$ or $CO_2$, or $H_2O+CO_2$ content superior to 0.03%; a controlled dew point ranging from −50 to −15° C.; and a controlled concentration of $CO+CO_2$ maintained below 2%, wherein all percentages are expressed in terms of volume.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
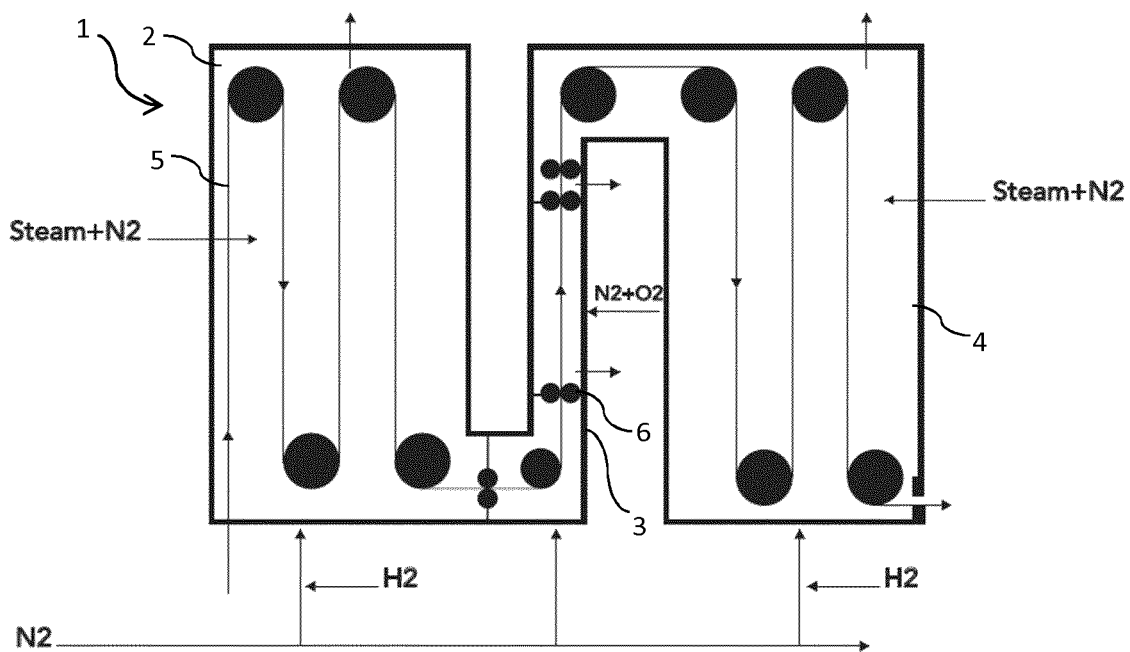
FIG. 1 schematically represents an annealing furnace comprising three separated sections according to the invention. The incoming and outgoing flows through the different sections are also schematically represented.

The present invention relates to a method for controlling the surface reactions on a steel strip running through a furnace comprising successively a first section, a second section and a third section, the atmosphere in the second and third sections being oxidizing and reducing respectively, wherein in the first section, the atmosphere is oxidizing to potentially form an iron oxide layer, said atmosphere having a $H_2$ content inferior to 2%, a $O_2$ content inferior to 0.1% and a $H_2O$ or $CO_2$, or $H_2O+CO_2$ content superior to 0.03% and, preferably, superior to 0.035%, the percentages being expressed in volume.

According to particular preferred embodiments, the method according to the invention further discloses at least one or a suitable combination of the following features:
- the dew point in the first section is controlled and ranges from −50 to −15° C. and, preferably, from −30 to −15° C.;
- the strip is heated in the first section between 600 and 750° C., preferably between 650 and 750° C. and, more preferably, between 650 and 700° C.;
- the concentration of $CO+CO2$ is controlled in the first section and maintained below 2% in volume;

in the second section, a mixture of an oxidant medium and an inert gas is injected, said oxidant medium being oxygen and the concentration of oxygen in the mixture being comprised between 0.1 and 5% and preferably between 0.5 and 2% in volume;

the mixture is injected with a flow ranging from 50 to 300 Nm3/h for each side of the strip; in the second section, the temperature of the strip is maintained between 500 and 700° C.;

the residence time of the strip in the second section is comprised between 1 and 10 seconds;

in the third section, the strip is heated up to a temperature comprises between 750 and 870° C.;

in the third section, the concentration of H2 is adjusted between 3% and 30%, and preferably between 5 and 20% in volume; and in the third section, the dew point is controlled to be between −50 and −5° C. and, preferably, between −20 and −10° C.

The present invention also relates to a furnace for carrying out the method as described above, said furnace comprising a first section, a second section and a third section located respectively in distinct casings, each section being provided with control means, wherein the first section is provided with means for controlling the dew point, the H2 content and the CO content.

According to a particular embodiment, the first section of the furnace comprises a resistance heating, an inductive heating or a radiant tube heater.

The invention aims to provide a method with process parameters adjusted to get an optimized wettability for alloyed steels. To this end, a furnace has been specifically developed. This furnace has different sections each located in a distinct casing comprising means to carefully control the atmosphere. The furnace is dedicated to anneal steel sheets to be coated by a liquid metal comprising Zn, Al or a combination of those two in various proportions with addition of Mg and Si in proportion higher than 0.1%. The furnace according to the invention can also be used in a continuous annealing line without hot-dip galvanizing facilities.

As shown in FIG. 1, this furnace comprises three well-defined sections which are separated by efficient sealing devices. Well-defined means that each section is located in a casing having its own heat insulation, heating components if required and control means, the latter being means for controlling the dew point, the hydrogen content, the oxygen content, the carbon monoxide content and the temperature.

The first section is a classical heating section comprising heating elements and rolls. It is designed with a technology well-known for the skilled person. In this section, it is essential to have an atmosphere slighting oxidizing to limit the risk of external oxidation of the alloying elements and potentially to start forming a Fe oxide in some cases. To this end, the $H_2$ content is below 2%, the $O_2$ level is below 0.1% but the $H_2O$ or $CO_2$ content or the sum $H_2O$ and $CO_2$ ($H_2O+CO_2$) is superior to 0.03% and preferably superior to 0.035% to obtain this atmosphere slightly oxidizing. The atmosphere is controlled in terms of $H_2$, dew point and CO, the rest being inert gas. It is controlled with a $H_2$ content below 2% as indicated above, a dew point between −50 and −15° C. and, preferably, between −30 and −15° C. Those target values are adjusted by injecting a mixture $H_2+N_2$ with a given proportion of hydrogen and by an eventual injection of steam if required. The sum CO and $CO_2$ ($CO+CO_2$) is maintained below 2% to avoid a combustion in the section. The strip is heated to a temperature between 600 and 750° C., preferably between 650 and 750° C., and more preferably between 650 and 700° C., said temperatures being measured by pyrometers.

Figure 2:
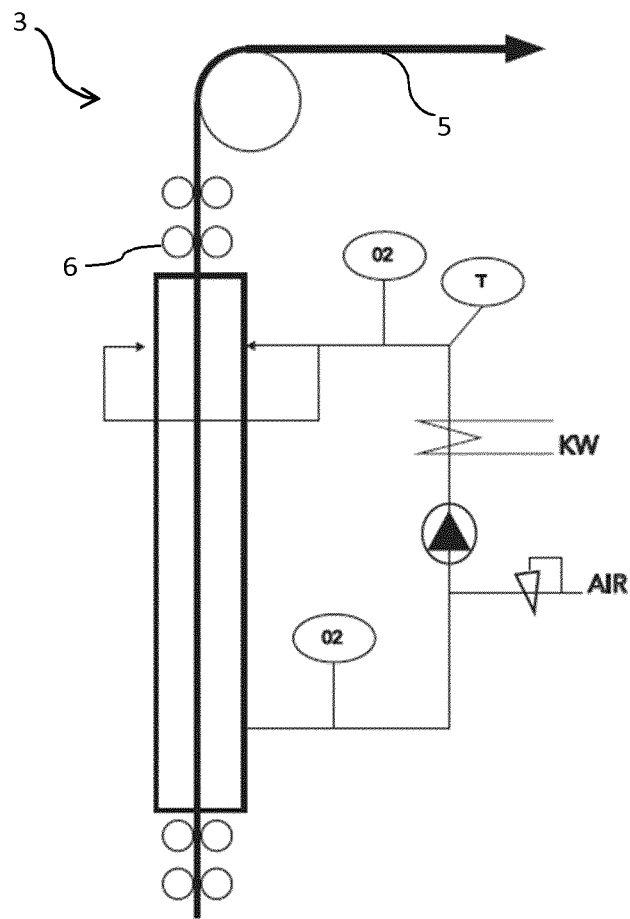
FIG. 2 represents according to the invention the control means for regulating the parameters of the atmosphere in the second section i.e. in the oxidation section.

In the second section, a mixture of $O_2$ and $N_2$ is injected to form a controlled iron oxide layer on the surface of the steel sheet. The concentration of $O_2$ ranges from 0.1 to 5% but, preferably, between 0.5 and 2%. This section can have various shapes like U shape which imposes to use one or 2 turn down roll(s), or to be straight without any rolls. The length of this chamber is calculated to have a residence time of the strip between 1 and 10 sec. This chamber can comprise heating elements if required but it is heat insulated. The oxidant medium which is mainly based on oxygen but can also comprise C02, can be injected in this chamber by specific devices as described in document EP 15162341. This atmosphere is injected on each side separately. It can be either fresh or recirculated, cold or heated. Preferably, the injected flow is recirculated by a fan. The reacted atmosphere from the chamber is sucked by a fan, the oxidant content is adjusted by a device adding some air according to the oxidant content desired. The temperature of this inert gas+oxidant mixture is adjusted preferably in the range of 500 and 700° C. by a heating element and is finally injected with a defined flow on each side of the strip. The volume injected depends on the chamber size but is typically superior to 50 $Nm^3$/h and preferably between 100 and 300 $Nm^3$/h per side for a 2 meter wide chamber. An example of means for controlling the atmosphere parameters in the second section is given in FIG. 2. To minimize the escape of the oxidant in the first and third parts of the furnace, the sealing system is preferably composed of two pairs of rolls with injection of and extraction of the atmosphere between the two pairs. Since this section has its own full casing, it is easy to install devices on each side of the strip to measure the oxide thickness on the running sheet. The control means can further comprise a scanning system to check if the oxide thickness is uniform.

The third section of the furnace is similar to the first one and has the objective of heating the strip to the desired temperature, preferably between 750 and 870° C. The atmosphere in this section is composed of a gas able to reduce the iron oxide formed in the second chamber. The classical practice is to use $H_2$ mixed with an inert gas. The concentration of $H_2$ is adjustable between 3 and 30%, preferably between 5 and 20%, depending on the aimed reduction kinetics. The dew point in this section is controlled between −50 and −5° C. with a preferred range of −20 to −10° C. when high strength steels are processed. The control of the incoming and outgoing flows of inert+$H_2$ gas in this section is based on the measurements of the pressure, $H_2$ content and dew point in each section as well as the opening of the various valves to let escape the atmosphere and promote an eventual dilution. Finally, the atmosphere of this section is separated from the fourth section of the furnace which is the cooling section by dampers or similar like pair of rolls or baffle plate, to limit the exchange of this atmosphere with those of the next sections.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS (1) Annealing furnace
(2) First section
(3) Second section
(4) Third section
(5) Strip or sheet
(6) Sealing roll

The invention claimed is:

1. A method for controlling surface reactions on a steel strip running through a furnace comprising, successively, a first section, a second section, and a third section separated by a sealing element, an atmosphere in the second and third sections being oxidizing and reducing respectively, the method comprising:
heating, in the first section, the steel strip to between 600 and 750° C., the first section comprising a resistance heater, an inductive heater, or a radiant tube heater, while causing the atmosphere therein to be slightly oxidizing and to include:
an $H_2$ content inferior to 2%;
an $O_2$ content inferior to 0.1%;
an $H_2O$ or $CO_2$, or $H_2O+CO_2$ content superior to 0.03%;
a controlled dew point ranging from −50 to −15° C.; and
a controlled concentration of $CO+CO_2$ maintained below 2%,
wherein all percentages are expressed in terms of volume; and
wherein the atmosphere in the second section comprises a concentration of oxygen of between 0.1 and 5% by volume.

2. The method according to claim 1, wherein the dew point in the first section ranges from −30 to −15° C.

3. The method according to claim 1, wherein the strip is heated in the first section to between 650 and 750° C.

4. The method according to claim 1, wherein, in the second section, a mixture of oxygen and nitrogen is injected on each side of the strip with a concentration of oxygen in the mixture being comprised of between 0.1 and 5% in volume.

5. The method according to claim 1, wherein, in the second section, the temperature of the strip is maintained between 500 and 700° C.

6. The method according to claim 1, wherein a residence time of the strip in the second section is between 1 and 10 seconds.

7. The method according to claim 1, wherein, in the third section, the strip is heated up to a temperature of between 750 and 870° C.

8. The method according to claim 1, wherein, in the third section, the concentration of $H_2$ is adjusted between 3% and 30% in volume.

9. The method according to claim 1, wherein, in the third section, the dew point is controlled to be between −50 and −5° C.

10. The method according to claim 1, wherein the $H_2O$ or $CO_2$, or $H_2O+CO_2$ content is superior to 0.035%.

11. The method according to claim 3, wherein the strip is heated in the first section to between 650 and 700° C.

12. The method according to claim 4, wherein the mixture is comprised of between 0.5 and 2% in volume.

13. The method according to claim 8, wherein the concentration of $H_2$ is adjusted between 5 and 20% in volume.

14. The method according to claim 9, wherein, in the third section, the dew point is controlled to be between −20 and −10° C.

15. The method according to claim 1, wherein the atmosphere in the second section comprises a concentration of oxygen of between 0.5 and 2% by volume.

16. The method according to claim 1, wherein the atmosphere in the second section comprises a concentration of oxygen of between 0.5 and 5% by volume.

17. The method according to claim 1, wherein, in the second section, a mixture of oxygen and an inert gas is injected on each side of the strip with a concentration of oxygen in the mixture being comprised of between 0.1 and 5% in volume.

* * * * *